(12) United States Patent
Edinger

(10) Patent No.: US 11,612,939 B2
(45) Date of Patent: Mar. 28, 2023

(54) SYSTEM AND METHOD FOR CONDITIONING AND DISTRIBUTING METAL POWDER FOR ADDITIVE MANUFACTURING

(71) Applicant: Ralf Edinger, Richmond (CA)

(72) Inventor: Ralf Edinger, Richmond (CA)

( * ) Notice: Subject to any disclaimer, the term of this patent is extended or adjusted under 35 U.S.C. 154(b) by 99 days.

(21) Appl. No.: 17/190,363

(22) Filed: Mar. 2, 2021

(65) Prior Publication Data

US 2022/0281008 A1 Sep. 8, 2022

Related U.S. Application Data

(60) Provisional application No. 62/988,339, filed on Mar. 11, 2020.

(51) Int. Cl.
| | | |
|---|---|---|
| *B22F 12/13* | (2021.01) | |
| *B33Y 30/00* | (2015.01) | |
| *B22F 10/85* | (2021.01) | |
| *B22F 12/53* | (2021.01) | |
| *B23K 15/00* | (2006.01) | |
| *B33Y 50/02* | (2015.01) | |

(52) U.S. Cl.
CPC .............. *B22F 12/13* (2021.01); *B22F 10/85* (2021.01); *B22F 12/53* (2021.01); *B23K 15/0026* (2013.01); *B33Y 30/00* (2014.12); *B33Y 50/02* (2014.12)

(58) Field of Classification Search
None
See application file for complete search history.

(56) References Cited

U.S. PATENT DOCUMENTS

| | | | | |
|---|---|---|---|---|
| 2015/0314389 | A1* | 11/2015 | Yamada | ................. B29C 64/25 |
| | | | | 219/76.1 |
| 2020/0269345 | A1* | 8/2020 | Yamada | ................. B22F 10/38 |
| 2021/0379670 | A1* | 12/2021 | Leard | .................... B29C 64/277 |
| 2022/0062983 | A1* | 3/2022 | Schmitt | ................... B22F 12/13 |
| 2022/0126521 | A1* | 4/2022 | Hashimoto | ............ B29C 45/77 |

FOREIGN PATENT DOCUMENTS

| | | | | | |
|---|---|---|---|---|---|
| CN | | 111036906 A | * | 4/2020 | ............. B22F 10/00 |
| JP | | 2016016586 A | * | 2/2016 | |

* cited by examiner

*Primary Examiner* — Timothy Kennedy
*Assistant Examiner* — Farah Taufiq

(57) ABSTRACT

Examples of a system for additive manufacturing are described. The system comprises a powder reservoir for storing the metal powder operatively coupled to a working chamber that includes a powder feeder with a housing that defines an inner cavity with an inlet and a number of nozzles in communication with the inner cavity of the powder feeder defining an outlet of the feeder. The number of nozzles are positioned around a center axis of a generated energy beam. A powder feeder's driver is configured to drive flow of the powder through the nozzles directly into a beam path such that an exact amount of the powder is placed into the beam path to be melted or sintered onto a powder bed.

8 Claims, 1 Drawing Sheet

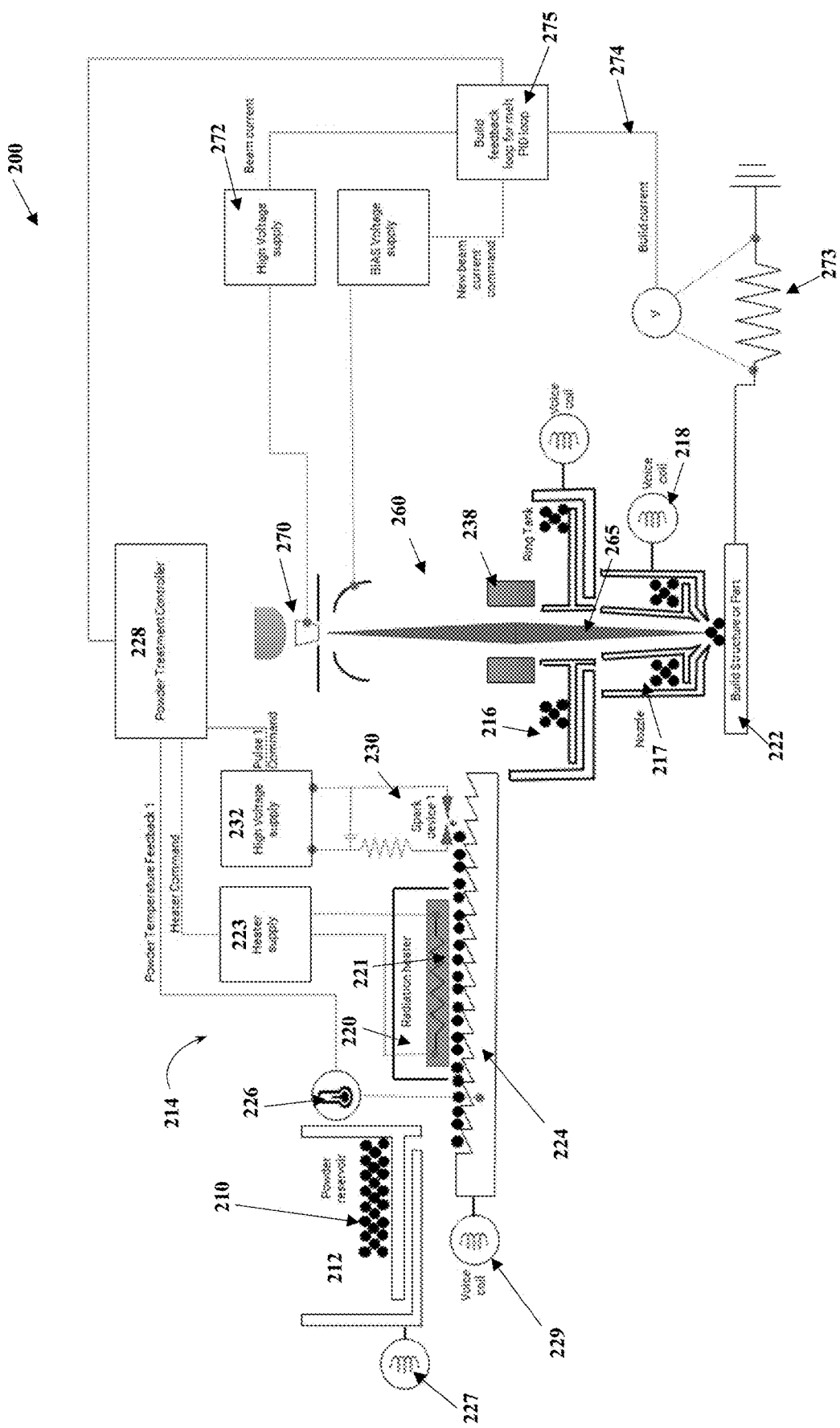

SYSTEM AND METHOD FOR CONDITIONING AND DISTRIBUTING METAL POWDER FOR ADDITIVE MANUFACTURING

TECHNICAL FIELD

The present disclosure relates to a system and a method for additive manufacturing with direct energy deposition.

BACKGROUND

Additive manufacturing technology, such as an electron-beam melting (EBM) technology, takes place under vacuum, in which products are manufactured by melting metal powder, layer by layer, with an electron beam as a heat source. The EBM process usually consists of three major steps: 1) preheating a powder bed workpiece to higher temperature depending on the material/metal using an electron beam energy 2) depositing and spreading a thin layer (in microns) of the metal powder on the powder bed, and 3) melting the powder using the electron beam. The process takes place under vacuum, which makes it suited to manufacture parts in reactive materials with a high affinity for oxygen, e.g. titanium.

The metal powder placed on the powder bed needs to be electrically conductive to avoid being displaced by electrostatic charging when an electron beam is focused onto the powder. Metal oxide layers are usually formed on a surface of the metal powder, creating an isolating layer which makes the metal powders purely conductive. When such metal powders are exposed to the electron beam, electrons absorbed by the metal oxide will charge such metal particles. Once a charge is high enough, the voltage in the particle will discharge to the ground and the resulting energy charge will eject the powder fly away from the build surface or melt area (energy surcharge will propel the powder from the build surface and the absence of material will result in defective parts). The absence of material on the build surface will result in defective parts. Therefore, the metal powder used in electron beam additive manufacturing must be made electrically conductive before melting can occur.

In the system known in the prior art, the build surface is first preheated using the electron beam to a predetermined temperature. After reaching the predetermined temperature, a thin layer of metal powder is spread over the build surface with a raking system where the stored heat of the build surface will heat the metal powder. The beam is then again scanned over the powder surface in a post heating step, in order to further sinter the powder together and increase the necks. Once the powder is sintered, the melting process can begin and a part is built.

SUMMARY

In one aspect, additive manufacturing system is provided. The additive manufacturing system comprises a powder reservoir for storing the metal powder and a working chamber that comprises an energy source coupled to a high voltage supply and configured to generate an energy beam that is focused by a focusing element, a powder feeder that has a housing that defines an inner cavity with an inlet and a number of nozzles in communication with the inner cavity of the powder feeder defining an outlet of the powder feeder and a powder bed. The number of nozzles are positioned around a center axis of the energy beam. The powder feeder further comprises a driver configured to drive flow of the powder through the nozzles directly into a beam path so that the powder is directly injected through the number of nozzles into the generated electron beam path, such that an exact amount of the powder is placed into a beam path to be melted or sintered onto the powder bed.

In addition to the aspects and embodiments described above, further aspects and embodiments will become apparent by reference to the drawings and study of the following detailed description.

BRIEF DESCRIPTION OF THE DRAWINGS

Throughout the drawings, reference numbers may be re-used to indicate correspondence between referenced elements. The drawings are provided to illustrate example embodiments described herein and are not intended to limit the scope of the disclosure. Sizes and relative positions of elements in the drawings are not necessarily drawn to scale. For example, the shapes of various elements and angles are not drawn to scale, and some of these elements are arbitrarily enlarged and positioned to improve drawing legibility.

FIG. 1 is a schematic view of an example of an electron beam additive manufacturing system with a direct energy deposition.

DETAILED DESCRIPTION OF SPECIFIC EMBODIMENTS

FIG. 1 illustrates an example of an additive manufacturing system 200 employing a direct energy deposition system 260. The system 200 comprises a powder reservoir 212, and a powder feeder 216. In one embodiment, the system 200 can further comprise a system for preheating the metal powder 210 and a powder processing system 214 to treat the metal powder so that metal oxides are removed prior to the melting process. The powder process system 214 can include a heating chamber 220 with a heater 221, a heat supply 223, a driver 224 to drive the metal powder through the heating chamber 220, a temperature sensor 226 to detect a temperature of the metal powder in the heating chamber 220 and a controller 228 that controls the triggering time of the heat supply 223 and triggering time of the driver 224 to control the temperature in the heating chamber 220.

The heated metal powder from the heating chamber 220 flows into a powder feeder 216 from which it is fed in a number of nozzles 217. The metal powder from the number of nozzles 217 can be directly injected into the electron beam 265 generated by an energy source 270. The feeder 216 can be a ring tank which can feed the metal powder into any number of nozzles 217 placed around the beam's center axis. The powder can start flowing through the nozzles 217 by oscillating voice coil motors 218 so that exact amounts of powder is placed into the beam path 265. Once the powder is in the beam path 265 it can be molten or sintered depending on the beam power and the programmed layer thickness. The direct energy deposition technique is less wasteful than any known powder bed distribution technique while still allowing to build similar structures. The direct energy distribution process can be used for any surface, which includes the use of parts manufactured with other techniques where additional features are required.

The powder processing system 214 treats the metal powder so that metal oxides are removed prior to the distribution of the metal powder onto a powder bed 222 where the energy deposition system 260 (e.g. an electron beam gun) is used to melt the metal powder into melting pools which are then solidified before the powder bed 222 is driven in vertical Z direction and the next layer of metal powder is distributed on the powder bed 222.

The powder processing system 214, the powder feeder 216, the powder bed 222 and the energy deposition system 260 can all be positioned into a working chamber (not shown) that is under vacuum. A vacuum pump operatively coupled to the working chamber can be used to evacuate the air from the chamber. The powder reservoir 212 storing the metal powder can be position outside of the working chamber and can be operatively coupled to the working chamber without breaking the vacuum. In one embodiment, the powder reservoir 212 can be positioned within the working chamber.

In one implementation, the metal powder can be injected into the heating chamber 220 from the reservoir 212 using for example a voice coil actuator 227. In another embodiment, the metal powder can be displaced out of the reservoir 212 via gravity. The metal powder can then be distributed into the heating chamber 220 by the driver 224. For example, the driver 224 can be also a voice coil actuator 229. In one implementation, the driver 224 can comprise a conveyor belt driven by a stepper motor. In some embodiments, the metal powder can be driven via vibrational motion provided to the heating chamber 220.

The heater 221 can be a radiation heater that is coupled to the heat supply 223. The metal powder is heated to a pre-set temperature controlled by the powder process controller 228. The heat treatment of the metal powder will increase the conductivity of the metal powder by reducing the amount of oxide formation on the metal surface. The predetermined temperature to which the metal powder can be heated in the heating chamber depends on the type of the metal powder. For example, a titanium metal powder can be pre-heated at about 500 to 900° C. The sensor 226 can measure the temperature of the powder remotely. For example, the sensor 226 can be a fiber optic temperature sensor, such as a phosphor thermometry system. In one implementation, the sensor 226 can be a contact temperature measuring system.

In one implementation, the powder process system 214 can further include a pulse generator 230 to generate and deliver electromagnetic pulses to the metal powder to additionally increase the conductivity of the powder. The pulsed generator 230 can be positioned adjacent to the heater 221 and can be at some vertical distance above from the metal powder layer. A high voltage power supply 232 and a waveform generator (not shown) is used to cause the potential differential charge between pulse generator terminals to create electromagnetic pulses of electrical discharges (e.g., arcs) which improves the electric conductivity of the powder when the electromagnetic field travel through the exposed powder. Application of electromagnetic pulses (EMP) of low energy electrons (5-500 eV) over the metal powder will collide with the metal surface and eject a valence electron from the metal's orbitals. This will produce chemically reactive free radicals which will begin a series of chemical reactions which break the oxide layer further apart, thereby enhancing the electrical conductivity of the metal. By adjusting the energy of the electromagnetic pulse, it is possible to manage the extent of the oxide layer degradation, allowing precise feedback control over the metal's conductivity prior to entering the build surface.

In one implementation, a cryogenic pump vacuum system (not shown) can be coupled to the powder process system 214 to further reduce the formation of oxides by expelling gasses such as $H_2$, $H_2O$, and $O_2$ from the powder surface by pumping them out of the chamber 220. In one embodiment, a gas which would not reduce the conductivity of the powder when bonded to the metal atom can be injected into the heating chamber 220. For example, carbon monoxide (CO) or hydrogen (H) can be injected into the heating chamber 220. CO is a two electron-donating ligand which forms strong complexes with transition metals without altering their oxidation state. The reductive ability of CO increases as the temperature is increased, so application of the gas during the initial heating stage can help in producing a more conductive metal powder.

The metal powder from the powder process system 214 is injected into the powder feeder 216 that is used to feed the powder to the powder bed 222.

In one implementation, an additional heater (not shown) can be integrated into the powder bed 222 to preheat the powder bed 222 before the deposition of the metal powder onto the build surface of the powder bed 222.

The metal powder from the powder feeder 216 is directly fed to the powder bed 222 through the nozzle 217 and melt by the electron beam 265. The powder bed 222 moves in X direction to ensure the melted metal pools are distributed over the build surface in a homogeneous micron-thin layer. The energy deposition system 260 comprises an energy source 270 that can generate an energy beam 260 that is focused, using a focusing means 238, forming a focused energy beam 265. For example, the energy beam can be focused using a focus lens and/or coils 238 to converge the beam radially to form a focal spot. The energy beam can further be deflected (using a deflection lens and/or coils) to change the direction or path of the beam 265. The formed melting pools are then rapidly solidified forming a layer of a product. The powder bed 222 can then move in Z-direction to provide layer by layer structure of the product. For melting larger build areas, the powder bed can move mechanically in X and Y directions synchronized with the beam deflection and therefore permitting to build parts that are larger than the deflection area.

The energy source 270 can be an electron gun that is attached to a high voltage supply 272. The build surface of the powder bed 222 is electrically isolated and connected with a resistor 273 to ground. Measuring the voltage across the resistor 273 will provide a voltage signal 274 equivalent of the actual current used for the melting process. This melt current is compared with the beam current from the high voltage power supply 272 and by subtracting the build current form the beam current the loss can be determined. The build resistance of the structure can be calculated and fed into a PID loop controller 275 to control and correct the beam current. The resistor 273 is an analog feedback and therefore fast enough to allow active process control during melting thus eliminating calculation prior to melting (no feedforward control loops).

While particular elements, embodiments and applications of the present disclosure have been shown and described, it will be understood, that the scope of the disclosure is not limited thereto, since modifications can be made by those skilled in the art without departing from the scope of the present disclosure, particularly in light of the foregoing teachings. Thus, for example, in any method or process disclosed herein, the acts or operations making up the method/process may be performed in any suitable sequence and are not necessarily limited to any particular disclosed sequence. Elements and components can be configured or arranged differently, combined, and/or eliminated in various embodiments. The various features and processes described above may be used independently of one another, or may be combined in various ways. All possible combinations and subcombinations are intended to fall within the scope of this disclosure. Reference throughout this disclosure to "some embodiments," "an embodiment," or the like, means that a particular feature, structure, step, process, or characteristic described in connection with the embodiment is included in at least one embodiment. Thus, appearances of the phrases "in some embodiments," "in an embodiment," or the like, throughout this disclosure are not necessarily all referring to the same embodiment and may refer to one or more of the same or different embodiments. Indeed, the novel methods and systems described herein may be embodied in a variety of other forms; furthermore, various omissions, additions, substitutions, equivalents, rearrangements, and changes in the form of the embodiments described herein may be made without departing from the spirit of the inventions described herein.

Various aspects and advantages of the embodiments have been described where appropriate. It is to be understood that not necessarily all such aspects or advantages may be achieved in accordance with any particular embodiment. Thus, for example, it should be recognized that the various embodiments may be carried out in a manner that achieves or optimizes one advantage or group of advantages as taught herein without necessarily achieving other aspects or advantages as may be taught or suggested herein.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without operator input or prompting, whether these features, elements and/or steps are included or are to be performed in any particular embodiment. No single feature or group of features is required for or indispensable to any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

The example calculations, simulations, results, graphs, values, and parameters of the embodiments described herein are intended to illustrate and not to limit the disclosed embodiments. Other embodiments can be configured and/or operated differently than the illustrative examples described herein.

The invention claimed is:

1. An additive manufacturing system comprising:
   a powder reservoir for storing a metal powder;
   a working chamber comprising:
      an electron gun coupled to a high voltage supply and a focusing element, the electron gun configured to generate an energy beam that is focused by the focusing element;
      a powder feeder having a housing defining an inner cavity with an inlet and a number of nozzles in communication with the inner cavity of the powder feeder defining an outlet of the powder feeder, the number of nozzles being positioned around a center axis of the energy beam, the powder feeder further comprising an oscillating voice coil to drive flow of the powder through the nozzles directly into a beam path;
   a powder processing system positioned between and in fluid communication with the powder reservoir and the powder feeder and comprising:
      a heating chamber with a surface whereon the metal powder is positioned;
      a heater with a heat supply to heat the metal powder positioned on the surface;
      a powder driver to drive the metal powder through the heating chamber,
      a powder bed; and
   a powder treatment controller in electrical communication with the powder driver and the heater to control the temperature of the metal powder by controlling a triggering time of the heat supply and a triggering time of the powder driver,
   wherein the metal powder heated to a predetermined temperature enters into the inner cavity of the powder feeder and wherein the heated powder through the number of nozzles is directly injected into the generated electron beam path such that an exact amount of the powder is placed into a beam path to be melted or sintered onto the powder bed.

2. The additive manufacturing system of claim 1, wherein the powder feeder is a ring tank, the number of nozzles positioned around a ring opening of the powder feeder.

3. The additive manufacturing system of claim 1, wherein the powder processing system further comprising a temperature sensor to detect a temperature of the metal powder in the heating chamber, the temperature sensor being in electrical communication with the powder treatment controller, the powder treatment controller controlling the triggering time of the heat supply based on signals obtained from the temperature sensor.

4. The additive manufacturing system of claim 1, wherein the powder treatment controller triggers the powder driver in the heating chamber to dive the metal powder into the inner cavity of the powder feeder when the metal powder is heated to the predetermined temperature.

5. The additive manufacturing system of claim 1, further comprising a pulse generator positioned between and in fluid communication with the heater and the powder feeder, the pulse generator includes a high voltage power supply and a waveform generator to cause a potential differential charge between pulse generator terminals to create electromagnetic pulses of electrical discharges at a predetermined distance from the metal powder and improves its electric conductivity.

6. The additive manufacturing system of claim 1, wherein the surface in the heating chamber is a conveyor belt and the powder driver is a stepper motor driving the conveyor belt, the metal powder entering the heating chamber flows through the heating chamber until reaching the predetermined temperature.

7. The additive manufacturing system of claim 1, wherein the powder driver in the heating chamber is a voice coil actuator.

8. The additive manufacturing system of claim 1, further comprising a cryogenic pump vacuum system in communication with the heating chamber of the powder processing system to pump gasses from a powder surface out of the heating chamber.

* * * * *